(12) United States Patent
Geisow et al.

(10) Patent No.: US 6,590,558 B2
(45) Date of Patent: Jul. 8, 2003

(54) ELECTRO-OPTIC DISPLAYS

(75) Inventors: Adrian Derek Geisow, Avon (GB); John Christopher Rudin, Bristol (GB)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/884,258

(22) Filed: Jun. 19, 2001

(65) Prior Publication Data

US 2001/0030637 A1 Oct. 18, 2001

Related U.S. Application Data

(62) Division of application No. 08/930,819, filed as application No. PCT/GB96/01009 on Apr. 29, 1996.

(30) Foreign Application Priority Data

Apr. 28, 1995 (EP) .............................. 95302888

(51) Int. Cl.[7] .................................................. G09G 3/36
(52) U.S. Cl. ........................... 345/97; 345/87; 345/103; 345/90
(58) Field of Search ........................... 345/97, 90, 87, 345/103, 89, 63

(56) References Cited

U.S. PATENT DOCUMENTS

| | | | |
|---|---|---|---|
| 4,449,125 A | * | 5/1984 | Clerc et al. .................... 345/87 |
| 4,655,561 A | * | 4/1987 | Kanbe et al. .................. 345/97 |
| 4,747,671 A | * | 5/1988 | Takahashi et al. ............ 345/97 |
| 4,824,218 A | | 4/1989 | Kuno et al. |
| 4,828,370 A | | 5/1989 | Suzuki |
| 5,208,689 A | | 5/1993 | Hartmann et al. |
| 5,404,236 A | | 4/1995 | Hartmann et al. |
| 5,739,798 A | | 4/1998 | Lockmuller |
| 6,295,044 B1 | * | 9/2001 | Geisow et al. .............. 345/103 |

FOREIGN PATENT DOCUMENTS

EP  0 462 619 A2  12/1991

OTHER PUBLICATIONS

Patent Abstracts of Japan–vol. 011, No. 308 (P–624), Oct. 8, 1997 & JP, A, 62 100739 (Matsushita Electric Ind. Co. Ltd.), May 11, 1987.

* cited by examiner

Primary Examiner—Amare Mengistu
Assistant Examiner—Jimmy H. Nguyen (57) ABSTRACT

An electro optic display (10) provides an electrode configuration adjacent each pixel which allows a non-uniform electrical field to be applied across the pixel (22) so that the optical output varies in the direction transverse to the pixel thickness. This allows only part of the pixel to be turned ON, or for shading within the pixel, depending on the characteristics of the electro-optic material. In a preferred embodiment the row and column electrodes (14, 17) are each made up of a group of conductive tracks (12, 18) connected into groups by impedance elements (13, 19). Voltage ramps are applied across the electrodes via input electrodes 15 and 20. A multiphase drive scheme is described for ferro-electric and similar materials in which a number of different voltage ramps are applied to a row in succession, and at each phase the appropriate ramps are applied simultaneously to the column electrodes to build up the required pixel shape over a number of phases.

11 Claims, 9 Drawing Sheets

ELECTRO-OPTIC DISPLAYS

The above-identified application is a divisional of U.S. patent application Ser. No. 08/930,819 filed Oct. 8, 1997 which is the U.S. National Stage Appl. of PCI International Appl. No. PCT/GB96/01009 filed Apr. 29, 1996.

FIELD OF THE INVENTION

This invention relates to electro-optic displays.

BACKGROUND OF THE INVENTION

Many computer displays have a limited physical resolution—typically 70–100 dots per inch (2.76 to 3.94 dots per mm). Since the display is composed of an array of rectangular pixels, each of which is either ON or OFF, the edges of text, lines, etc. that are displayed may often have a jagged "staircase" effect which is visually disturbing.

There have been several attempts to solve this problem in a variety of ways e.g. by grey scale rendering or anti-aliasing. Some display technologies such as Twisted Nematic Liquid Crystal Displays (TN LCDs), cathode ray tubes, etc., allow the intensity of the whole area of a pixel to be varied. In these types of display, the intensity of each pixel may be selected in proportion to the area of the pixel that should be ON. Whilst this can reduce the visually disturbing staircase effect, it can make edges in the displayed image appear blurred, especially when viewed from close to the display.

Other display technologies do not allow a range of intensities over the whole area of the pixel display, in which case a range of intensities may be simulated by rapidly turning the pixel ON and OFF, sufficiently fast so that the eye sees the average intensity. This may be used with Super Twisted Nematic (STN) LCDs. Alternatively, each pixel may be divided into sub pixels, and a varying number turned on according to the desired intensity. The display must then be viewed from such a distance that the eye cannot resolve the sub pixels, or some optical blurring introduced to average out the intensity over the whole pixel. An example of this type of technique is described in JP-A-3142260, where each pixel is effectively divided into four sub pixel slices. The image to be displayed is analysed and two-bit pixel data is added to each pixel to turn on selected sub pixel slices during a pixel sub-scanning period. This allows a range of intensities to be displayed by varying the area of the pixel that is ON, in four discrete steps. However, by its nature this system is only capable of modulating the pixel output slice-wise and in many instances this will not give good smoothing, particularly where the edge to be smoothed is nearly perpendicular to the slice direction of the pixels.

A similar technique is disclosed in U.S. Pat. No. 4,824,218, which relates principally to Ferroelectric LCDs. Here a variable width portion of a pixel is turned on by driving a potential gradient across the width of the pixel by means of metal electrodes running along the edges of resistive transparent column electrodes. To allow the complete area of the pixel to be driven, whilst preventing crosstalk (i.e. unintentionally affecting other pixels in the same row), and to avoid a wasted area of the pixel nearest the "reference" metal electrode, the pixel is driven in two phases, swapping the role of the two metal electrodes between "reference" and "data". This technique relies on the fact that a Ferroelectric Liquid Crystal (FLC) material stores its state and can be written to again, adding to the area that has already been turned ON, which is not true for all bistable materials. This scheme also requires a blanking pulse to clear the whole pixel before the two writing phases. U.S. Pat. No. 4,824,218 also refers to an extension of this technique in which the display has row and column transparent resistive electrodes each with metal electrodes on either side. A four field drive scheme is described in which the display is scanned four times, following a blanking pulse, to make up a frame. As before the metal electrodes swap roles between data and reference electrodes. Because alternate electrodes are set to a fixed reference this arrangement does not allow great flexibility in the creation of sub pixel shapes.

SUMMARY OF THE INVENTION

Accordingly, in one aspect, this invention provides a display comprising:

a first substrate having thereon a plurality of row electrode means, a second substrate having thereon a plurality of column electrode means, a layer of electro-optic material disposed between said first and said second substrate, row drive means associated with said first substrate for applying a respective selected voltage profile across each row electrode means in a direction transverse to the thickness of said layer, column drive means associated with said second substrate for applying a respective selected voltage profile across each column electrode means in a direction transverse to the thickness of said layer, whereby the electrical field in each pixel in the direction transverse to the thickness of the electro-optic layer may be selected to provide a non-uniform optical output.

In a particularly preferred arrangement, each of said column electrode means and said row electrode means comprises a group of generally parallel conductive tracks.

We have found that the multiple track architecture for each of the row and column electrodes provides important and unexpected advantages when used in conjunction with drive means which apply a selected voltage profile across each of the groups of tracks making up an electrode. In this way the magnitude of the electrical field across the pixel may be varied in a direction transverse to the thickness of the electro-optic layer to provide a non-uniform optical output across the pixel. By contrast to the arrangements of U.S. Pat. No. 4,824,218, which use resistive electrodes driven by metal electrodes to either side, the multiple conductive tracks of the present invention may be driven by electrical contacts well away from the image area, thus considerably improving the aperture ratio of the display. Also, the previous arrangement of U.S. Pat. No. 4,824,218 requires accurate alignment of fine metal electrodes with each of the transparent resistive electrodes, whereas in the present invention the conductive tracks in each group may be coupled together by a resistive element in contact with the end regions of the conductive tracks to one side of the display, and an input electrode provided at each end of the resistive element. Here the accuracy of alignment of the tracks and the resistive elements is not so important as the resolution of the conductive tracks may be effectively decoupled from that of the resistive elements.

Thus, in one embodiment, the resistive elements may be formed on the first and second substrates, in electrical contact with the respective conductive tracks. Alternatively, the row and column resistive elements may be formed on separate substrates which are then placed in contact with the first and second substrates.

For both the rows and the columns, the series of resistive elements driving the groups of conductive tracks may be replaced by a single resistive element in electrical contact with a substantial proportion of, or all the conductive tracks making up the complete set of row/column electrodes, with the drive means including an input electrode means between each group of conductive tracks.

Preferably, said drive means includes means for applying an adjustable voltage across each of said resistive elements, so that the voltage profile across the group of conductive tracks is a ramp of positive, negative or zero slope. Instead of resistance coupling, the drives to the groups of tracks may be inductively or capacitively coupled.

By the above arrangements, the electrical field may be configured to generate a wide range of different non-uniform outputs of selected shape for a pixel, to turn on an arbitrary portion of the pixel, so that the required edge of the line portion of the text character etc. is maintained within the area of the pixel.

In one preferred drive scheme, each of a set of predetermined voltage profiles is applied across a row electrode means in successive phases, and the columns driven in parallel with the required voltage profiles. In this way a broad range of pixel shapes may be provided in either a single write (i.e. just one of the phases) or a multiple write where the pixel output is incrementally rendered. It will be appreciated that this drive scheme could be modified so that the multiple successive phases are applied to the columns whilst the rows are driven in parallel.

The electro-optic material may have a steep or "fast" electro-optic curve, i.e. where the electro-optic effect switches state abruptly at a particular threshold voltage, so that the optical output at a particular point within the pixel will vary between two generally discrete levels, dependent on whether the field strength at that point is above or below the threshold voltage. In general the boundary between ON and OFF regions in the pixel will be determined by an equi-potential line on the notional voltage surface within the pixel of magnitude corresponding to said threshold voltage. Alternatively, the electro-optic material may have a shallow or "slow" electro-optic curve, with the output varying continuously between ON and OFF through grey levels, so that the optical output may be shaded across the pixel, generally in accordance with the magnitude of the electrical field.

We have found that the technique of providing modulation of the voltage field in a direction transverse to the thickness of the electro-optic layer may be extended to other forms of display, again to provide a non-uniform optical output, with remarkable results.

Thus, in another aspect this invention provides a display comprising:

first and second substrate means provided to either side of a layer of electro-optic material, the first substrate having thereon at least one electrically resistive surface, electrode means for applying selected voltages to respective points or regions across said resistive surface, and drive means for applying selected voltages to said electrodes to provide across a pixel an electrical field whose magnitude varies in at least one direction transverse to the thickness of the layer of electro-optic material, thereby to provide a non-uniform optical output across said pixel.

The first substrate may have an array of discrete electrically resistive surface elements each defining a pixel, with each surface element having three or more electrodes attached thereto. Thus, three or more selected voltages may be applied to spaced points or regions of said discrete resistive layer element, for example a respective voltage at each corner of a rectangular pixel. In this arrangement, each pixel effectively interpolates the four corner voltage values around the pixel and, for an electro-optic material with a steep curve, at each point within the pixel where the voltage passes the threshold value, the optical output changes.

We have also found that the ability to vary the optical output across a pixel instead of uniformly over the whole pixel means that we can provide displays which provide an effect similar to the half-tone type of process. In one arrangement the image is made up of pixels each containing a dot of controllably variable size from zero to fully filling the pixel, or even extending beyond its nominal boundary. Thus a display may comprise an electrode array of resistive electrodes with a plurality of connection points whereby an image may be created by a display of variable size dots.

The electro-optic material may comprise a liquid crystal material such as twisted nematic, superwist nematic, polymer dispersed liquid crystal (PDLC), or ferro-electric materials. Alternatively it may comprise other electro-optic materials or devices, such as field emissive devices.

In operation of a typical example, the image to be displayed is analysed to determine those pixels where some form of intra-pixel variation is required, for example where the pixel is lying on an edge of the image or where grey-scaling or half toning is required. For each such pixel, the display driver determines the desired boundary lines between ON and OFF, and the electrical field intensity required, and then selects suitable voltages to be applied to the pixel to generate the required variation or level of electrical field across the pixel.

Whilst the invention has been defined above, it extends to any inventive combination of the features set out above or in the following description.

BRIEF DESCRIPTION OF THE DRAWINGS

The invention may be performed in various ways and, by way of example only, certain embodiments thereof will now be described with reference to the accompanying drawings, in which:

FIG. 2 shows typical voltage profiles applied across a pixel and the non-uniform output obtainable in the embodiment of FIG. 1, with FIGS. 2(a) and (b) showing the voltage profiles applied across the row electrode and the column respectively, FIG. 2(c) showing the resultant electrical field set up across the pixel, and FIG. 2(d) showing the non-uniform optical output obtained;

FIG. 7 shows in FIG. 7(a) a typical voltage surface effected in the embodiment of FIG. 6, and in FIG. 7(b) the resultant non-uniform output obtained;

FIG. 9 shows in FIG. 9(a) a typical voltage surface effected in the embodiment of FIG. 8, and in FIG. 9(b) the resultant non-uniform output obtained;

DESCRIPTION OF THE PREFERRED EMBODIMENTS

Figure 1:
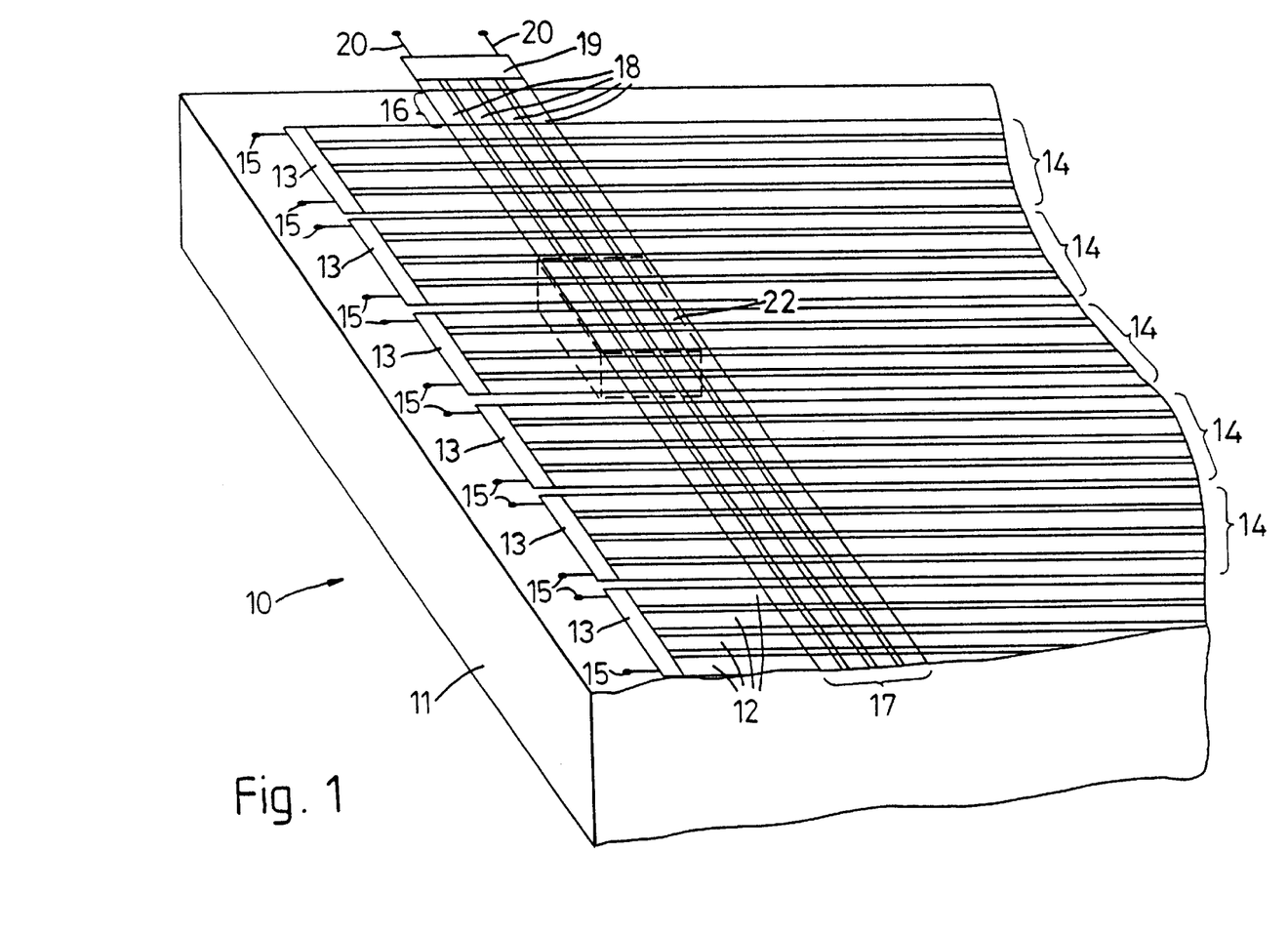
FIG. 1 illustrates schematically a first embodiment of liquid crystal display device in accordance with the invention.

Referring to FIG. 1, the first embodiment of LCD display 10 of this invention is illustrated. For clarity, the upper glass or polymer cover layer has been omitted, together with the usual polarising, barrier and retardation layers, but these are of generally conventional design. The display 10 comprises a lower glass or polymer substrate 11 on which a series of electrically conductive tracks 12 is formed, for example from a high conductivity Indium Tin Oxide (ITO) layer.

The conductive tracks 12 are connected together in groups of four by a resistive pad 13 to one side of the display, each group defining a composite row electrode 14. A selected voltage ramp may be applied across the resistive pad 13 by means of input electrodes 15. The voltage applied to each electrode is independently selectable to allow a range of voltage profiles to be applied. The effect of applying a voltage ramp across the resistive pad is to set each of the conductive tracks 12 making up the composite electrode to a predetermined adjustable voltage and effectively to set up a potential gradient across the lower surface of each of the pixels contained in the row, in the plane of the electrode. A polymer alignment layer (not shown) overlies the conductive tracks and serves to align the adjacent liquid crystal layer 16. Adjacent the upper surface of the liquid crystal layer 16 there is provided a further polymer alignment layer and a set of composite column electrodes 17 each comprising a group of conductive tracks 18 interconnected by resistive pads 19, and similar in construction and grouping to the row electrodes. A voltage ramp may be applied across the column electrode by means of input electrodes 20 at opposite ends of each of the resistive pads. In this arrangement a pixel 22 is defined at each crossing of a composite row electrode 14 by a composite column electrode 17.

As to be described the illustrated arrangement allows the orthogonal voltage profiles across the upper and lower surfaces bounding a pixel to be independently adjusted to apply a compound voltage profile to the pixel. The optical output at a particular point in the pixel will depend on whether the compound voltage at that point is or, for some materials, has been above the threshold voltage for that material. In this way a variety of complex geometrical shapes may be written within the pixel by suitable control of the voltage ramps applied to the relevant composite row and column electrodes.

Figure 2A:
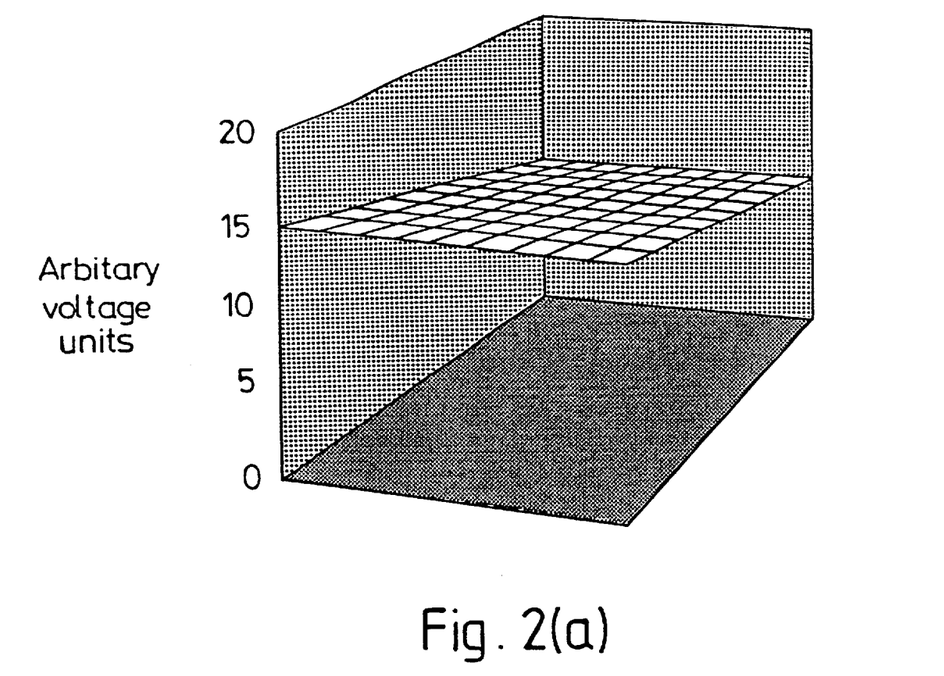
Figure 2B:
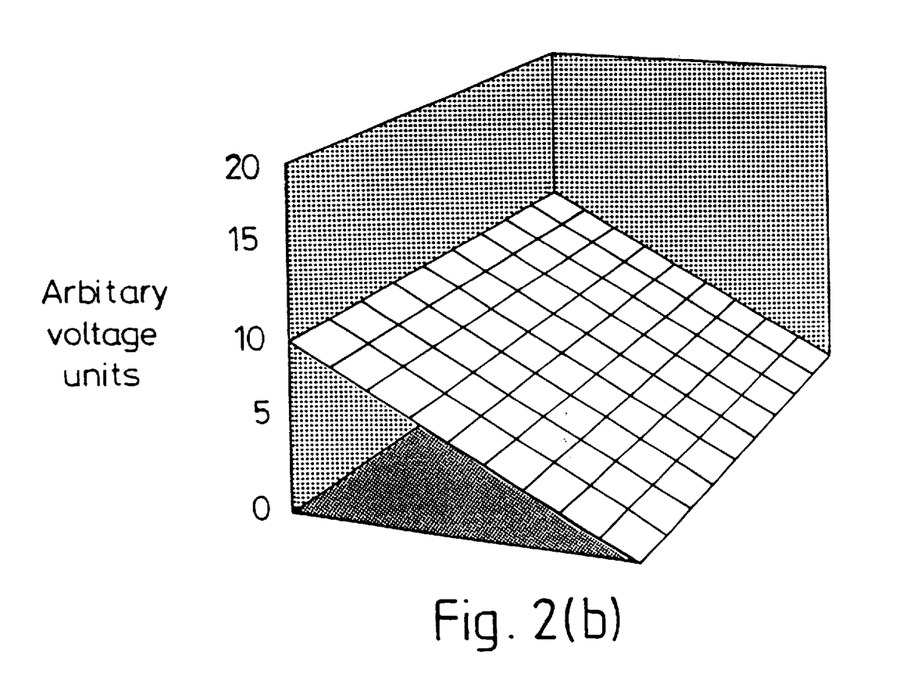
Figure 2C:
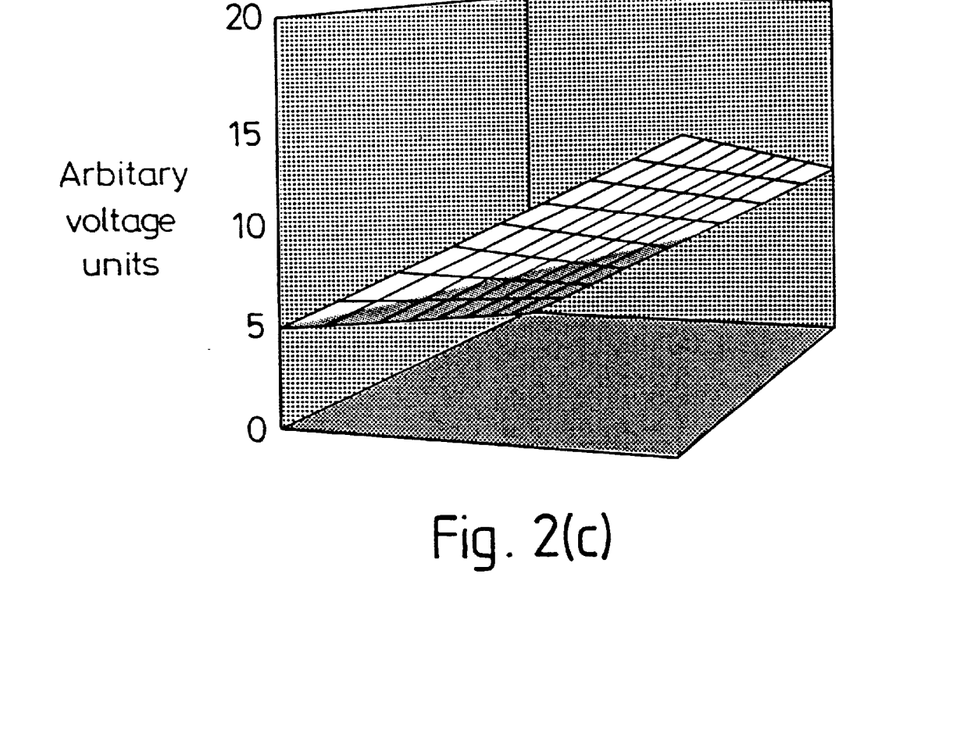
Figure 2D:
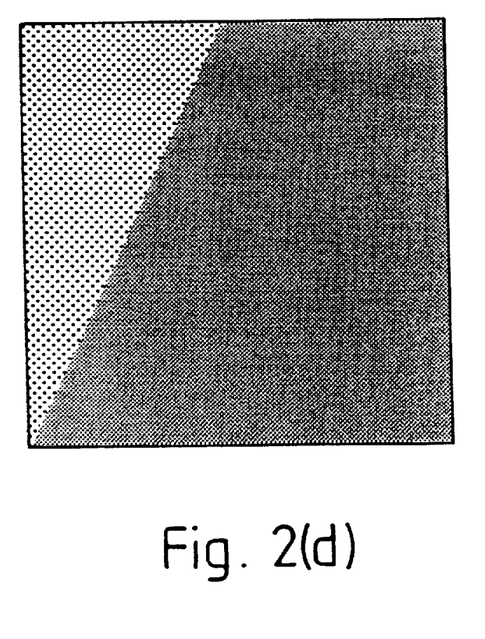

In the following, for convenience we refer to the electrodes applying continuously voltage surfaces across the upper and lower pixel faces but it will be appreciated that, due to the stepped nature of the composite electrodes, the voltage surfaces in practice may be stepped. It is assumed in this example, that the electro-optic material switches at 5 voltage units. FIG. 2(a) shows the voltage profile applied across the lower surface of the pixel by means of the relevant composite row electrode 14, by applying 10 voltage units to the upper row input electrode 15' and 15 voltage units to the lower row input electrode 15". Likewise FIG. 2(b) shows the voltage profile applied to the upper surface by means of the composite column electrode 17, by applying 10 voltage units to the left column electrode 20' and 0 voltage units to the right column electrode 20". FIG. 2(c) shows the resultant field across the pixel corresponding to the difference between the two voltage surfaces, and FIG. 2(d) gives the resultant optical output. In practice, due to the stepped nature of the voltage surfaces the dividing line may not be straight but this is unlikely to be perceptible. Naturally, the resolution may be improved by increasing the number of electrodes in a group.

A wide range of sub pixel shapes may thus be generated by suitable selection of the adjustable voltages (four in all) applied to the top/bottom input electrodes of the resistive pad 13 on the relevant composite row electrode 14,and the left/right input electrodes of the resistive patch on the relevant composite column electrode 17. It should be noted that selected sub portions of the pixel may be set or unset as required.

Figure 3:
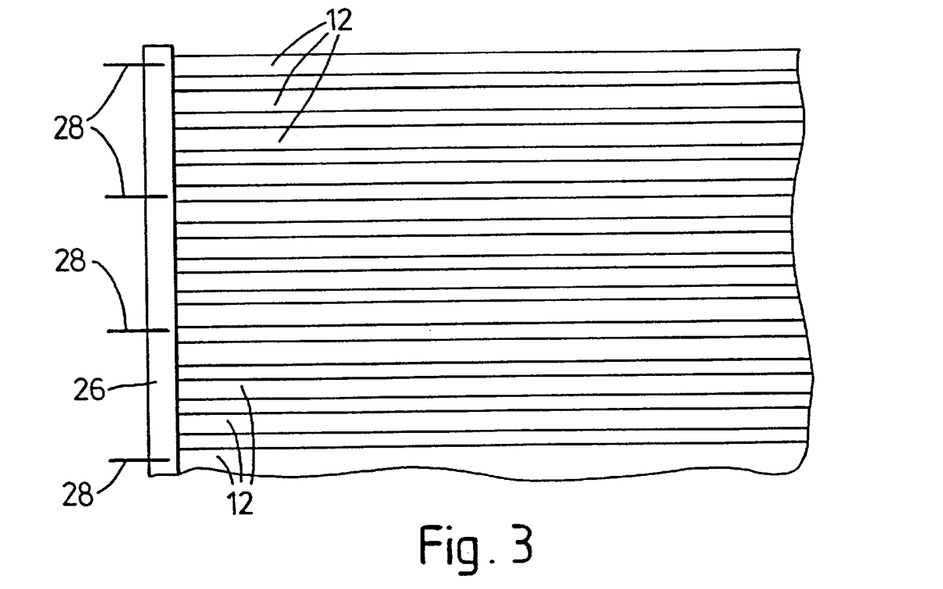
FIG. 3 illustrates an alternative driving electrode scheme for the embodiment of FIG. 1.

A modified electrode structure is shown in FIG. 3. Here a single resistive pad 26 is in electrical contact with the resistive tracks 12 making up a number of composite row electrodes, and may interconnect with all the row tracks 12. Between each group of tracks making up the electrode is an input electrode 28 so that the required voltage ramps may be set up across each of the composite row electrodes either singly, or in combination with a number of adjacent rows. Also, the whole, or a variable sized portion of the display may be driven, e.g. by driving the upper electrode of the first row and the lower electrode of the last row.

Various drive schemes are possible and two will now be described with reference to FIGS. 4 and 5. The first scheme is for a LCD material such as Ferroelectric LCD and similar materials which can be selectively set and unset. Firstly a blanking or erasure pulse is applied to a composite row electrode 14 to clear the pixels in the row. The row is then written by a multi-phase write, in which a finite set of voltage ramps is applied across the upper and lower input electrodes 15', 15" on the resistive pad, for example "High" (both set high), "Low" (both set low), positive slope (upper set high, lower set low) and negative slope (upper set low, lower set high).

At each phase, the composite column electrodes 17 that would require that particular "vertical" ramp on their lower surface have the appropriate respective horizontal ramps set on each of the input electrodes 20', 20" on each of the column resistive pads 19. This allows complex shape pixels to be set up as the union or difference of the primitive shapes set up by any particular combination of row/column ramps. The maximum amplitude of the two ramps is set below half the threshold voltage of the material to prevent cross talk. FIG. 4 shows how the shapes in the pixels in a given row may be built up in successive phases. Thus in phase 1 a steep positive ramp is applied to the composite row electrode 14. Simultaneously via the respective composite column electrodes 17, a positive ramp is applied to the first pixel, a low ramp is applied to the second, a negative slope to the third and fourth, and a high is applied to the fifth, to give the first phase results as shown. In the second phase a gentle positive slope is applied to the composite row electrode 14. Simultaneously, low ramps are applied to the first, third and fourth pixels (resulting in no change), a negative slope is applied to the second pixel and a positive slope applied to the fourth. This writes part of the second pixel and modifies the fifth pixel. In the next phase a gentle negative slope is applied to the composite row electrode. Simultaneously, low ramps are applied to the first second and fifth pixels, a positive slope is applied to the third pixel and a high slope applied to the fourth pixel.

Figure 4:
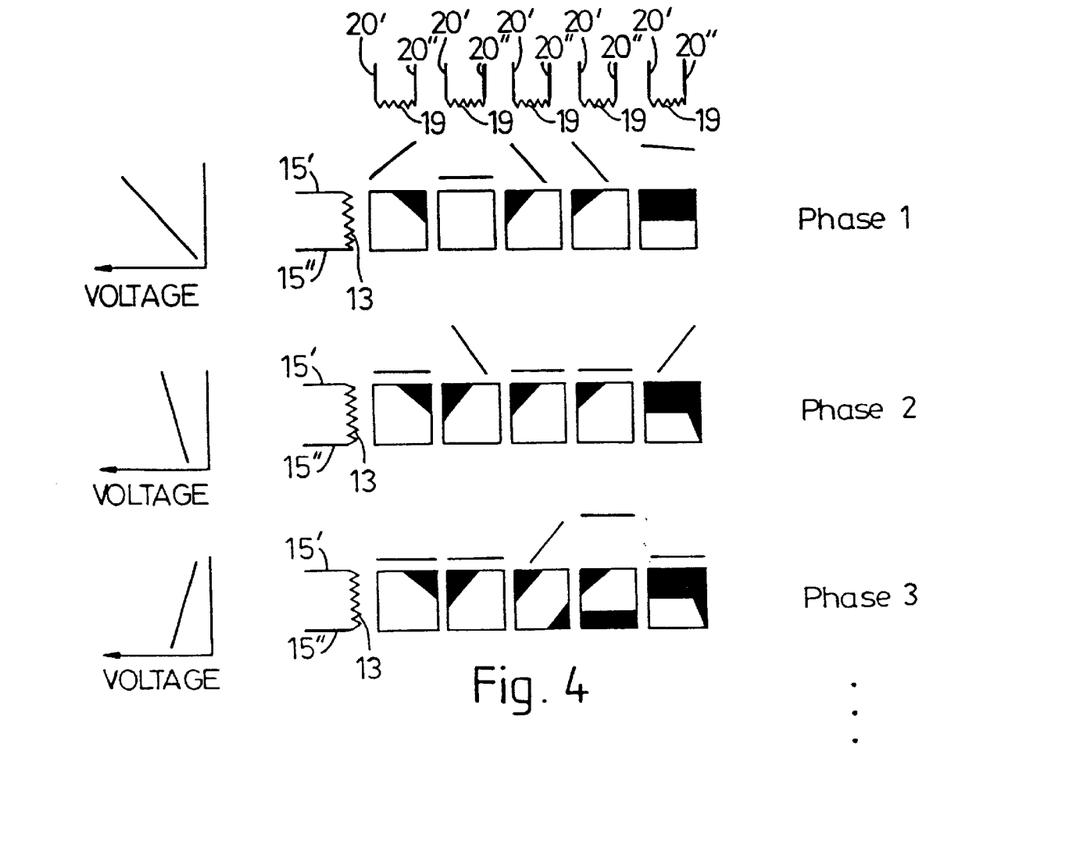
FIG. 4 illustrates schematically a first type of drive scheme for driving the embodiment of FIG. 1.

The display may be written with all the phases for a row completed before the next row is selected, as suggested by FIG. 4, or each phase may be written on a row by row basis, or a variety of interleaving schemes could be used, to maximise clarity and immediacy of the information displayed.

Figure 5:
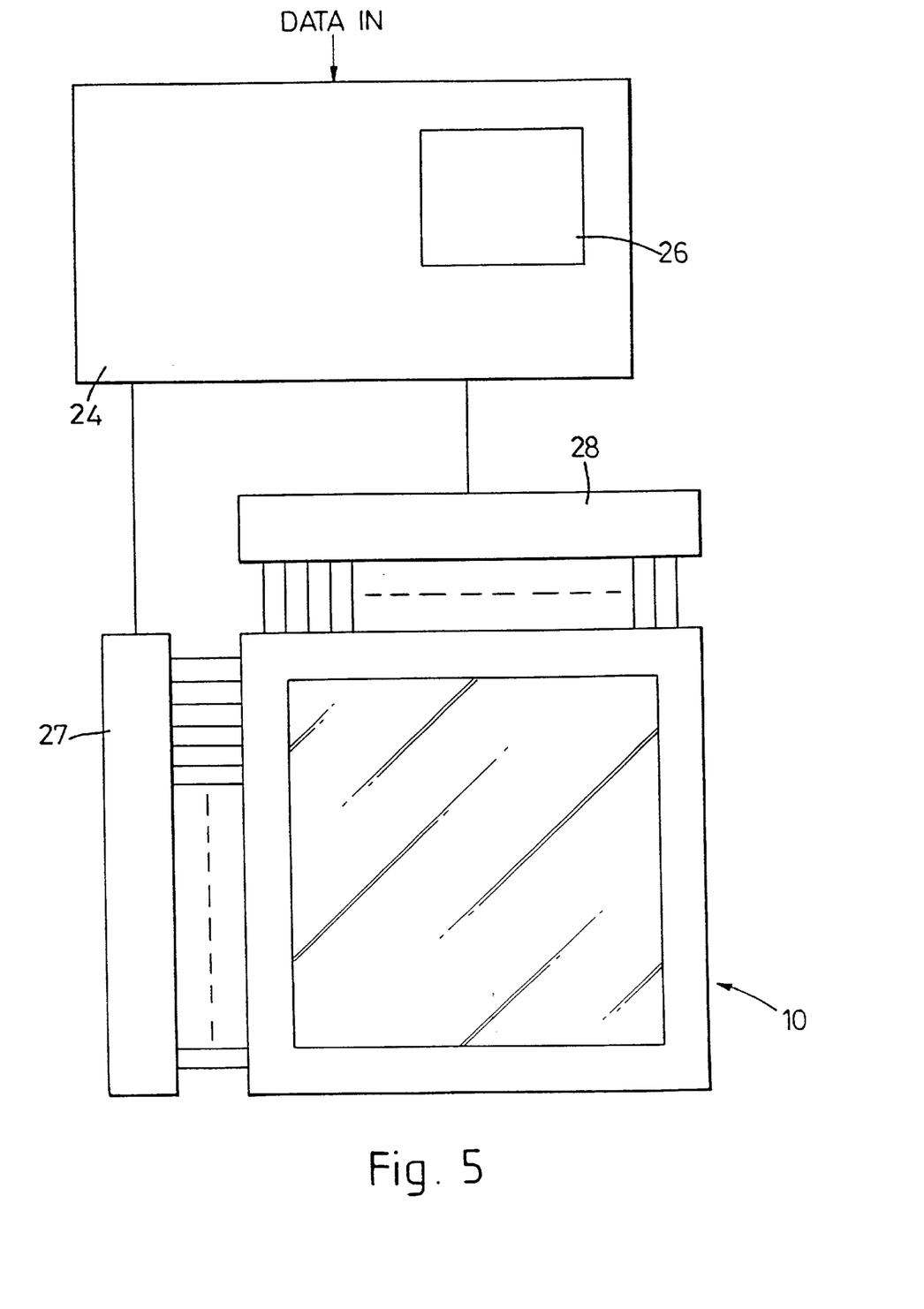
FIG. 5 illustrates a control system for controlling embodiment of FIG. 1.

Referring to FIG. 5, in this example the image data to be presented on the display 10 is processed using known processing techniques to determine the boundary pixels at the edge of text or images etc., where jagged edges would be visually unacceptable.

The image processor 24 incorporates a look up table 26 which indicates the pixel shapes obtainable and the voltage ramps required to produce these shapes. The image processor 24 then selects the appropriate voltage ramps for the driving phases to match the shapes required and controls the row and column drives 27, 28 accordingly.

In a preferred drive scheme for some materials such as Stabilised Cholesteric Liquid Crystals the previous state is wiped out on writing and thus no separate blanking pulse is applied. Here a modified approach is required. As before, a number of voltage ramps are set up on the row electrode in successive phases, but a drive ramp is applied to the column electrode of a particular pixel in only one row phase, that column being quiescent (i.e. at a level which will not induce switching), for the other phases.

This scheme give straight edges (or approximating thereto) to the intra-pixel boundary. For situations where the pixels may appear quite large, e.g. for electronic signs, projection displays, or head mounted displays, it is desirable to have more control over the edge shape of the boundary of the ON region of the pixel e.g. to provide generally smooth curves.

Figure 6:
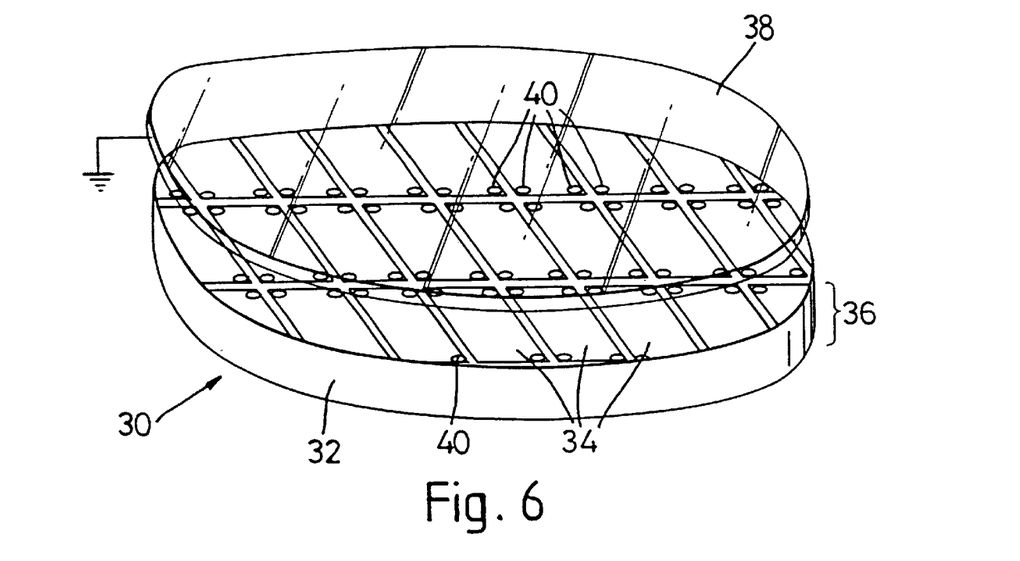
FIG. 6 illustrates schematically the pixel electrode scheme for a second embodiment of liquid crystal display device in accordance with the invention.

In the embodiment of FIG. 6, the output of each pixel may be varied non-uniformly by a multi-point electrode array provided here in the rear structure of the display, with a layer adjacent the upper surface of the liquid crystal layer providing a common ground plane. For clarity, the usual polymer alignment, polarising, barrier and retardation layers are not shown.

Figure 7A:
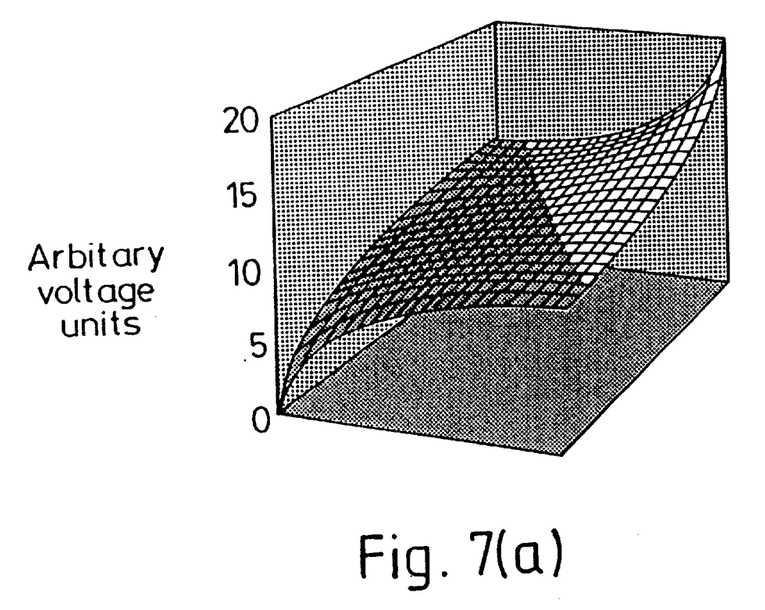
Figure 7B:
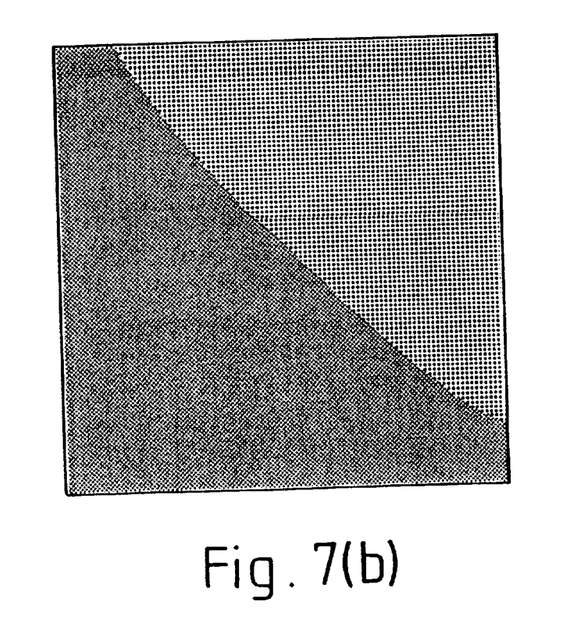

The display 30 includes a multi-layer rear structure 32 which defines an array of resistive surface elements 34, one adjacent each pixel, a liquid crystal layer 36, and a transparent common conductive layer 38 serving as a voltage ground plane adjacent the upper surface of the liquid crystal layer 36. Each resistive surface element 34 is energised by four control electrodes 40 or control points, one adjacent each corner of the surface element 34 respectively. The notional voltage surface generated over a pixel will depend on the levels of the voltages applied at the four corners tending to a smooth surface interpolating the four corner voltages, and can be adjusted by suitable selection of the four corner voltages, as illustrated in FIG. 7(a). The resultant non-uniform output generated by the voltage surface of FIG. 7(a) in an electro-optic material having a steep electro-optic effect is shown in FIG. 7(b), and generally provides a curved boundary.

Again a variety of drive schemes are possible depending on the number of pixels in the array. For a low number of pixels there may be sufficient space between or under the resistive surface elements to drive each corner voltage for all the pixels independently.

Likewise, the image to be displayed may be analysed by an image processor as described in relation to FIG. 5, to determine those pixels requiring non-uniform outputs, the shapes required, and the appropriate voltage combinations that will achieve this in a single phase or in multiple phases as required. The appropriate signals are then supplied to the row and column drives.

Figure 8:
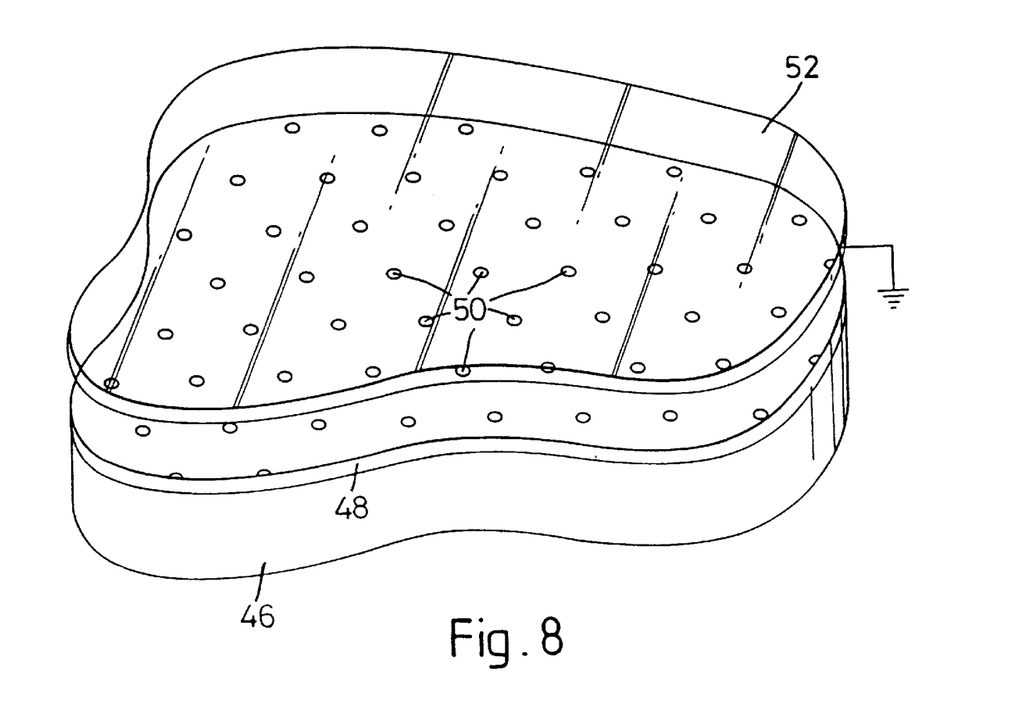
FIG. 8 illustrates schematically the pixel electrode scheme for a third embodiment of liquid crystal display in accordance with the invention.
Figure 9A:
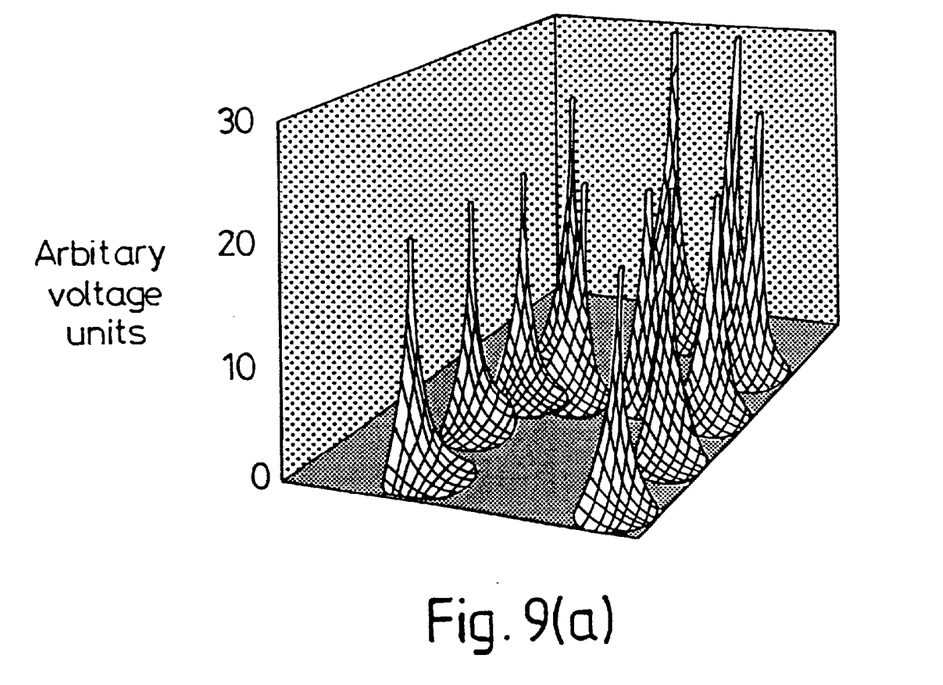
Figure 9B:
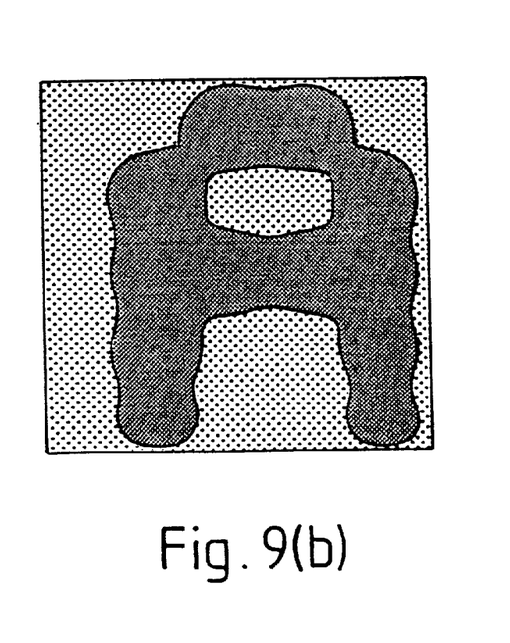

Referring now to FIG. 8, the third embodiment is similar in many respects to that of FIG. 6, as regards the general structure. In this embodiment, the display includes a rear multi-layer structure 46 on which is provided a continuous resistive layer 48, which is energised by an array of control electrodes 50 spaced closely across the layer. The liquid crystal layer is bounded on its other side by a transparent common conductive layer 52 serving as a ground plane. In use, the voltages applied to the electrodes may be selected to give a voltage surface including at each electrode location a voltage peak of selected magnitude as shown in FIG. 9(a). Where the liquid crystal material has a steep electro-optic curve, these peaks translate into dots of variable radius dependent on the radius of the peak at the threshold voltage. The drive voltages to the electrodes are therefore selected to give the required dot size, and a typical resultant image is shown in FIG. 9(b). This embodiment allows images to be displayed using a half-tone type of process. Dots of variable size may be generated and merged if required to give the final image. In this embodiment, each control electrode effectively defines an unbounded pixel which, depending on the voltage applied, may encroach into or merge with adjacent pixels.

The embodiments of FIGS. 6 and 7 may both use the multi-layer rear structure of the display to incorporate the electrode configurations required and this may be particularly suitable for displays using polymer dispersed liquid crystal material.

Figure 10:
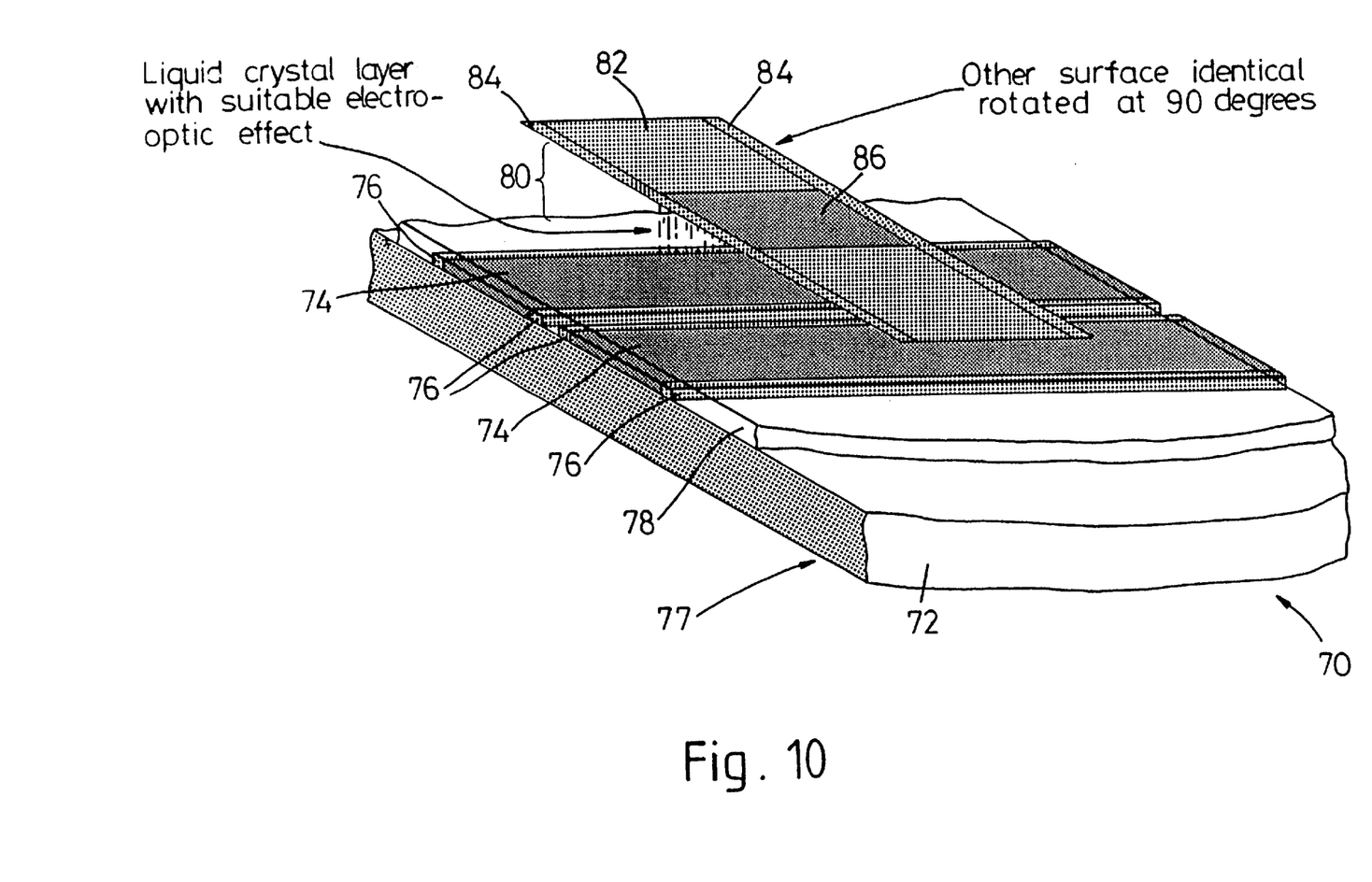
FIG. 10 illustrates schematically a fourth embodiment of liquid crystal display in accordance with this invention.

FIG. 10 shows a further embodiment of this invention, in which respective voltage ramps may be set up across the upper and lower surfaces of a pixel by setting two adjustable voltages on the relevant row electrode and two further adjustable voltages on the relevant column electrode, thus providing a similar effect to the embodiment of FIG. 1, and capable of using similar drive schemes. In this embodiment, the upper glass or polymer cover layer has been omitted, together with the usual polarising, barrier and retardation layers, but these are of generally conventional design. The display 70 comprises a lower glass or polymer substrate 77 on which a series of electrically resistive tracks 74 is formed, for example from a high resistivity linearly conductive Indium Tin Oxide (ITO) layer. To either side of each resistive track 74 is deposited a low resistivity conductor 76 in good electrical contact therewith, for example of chromium or gold, so that a generally linearly varying electrical field may be set up across the surface of the resistive track 74. In this example each resistive track 74 has its own pair of conductors 76, although in other arrangements, adjacent resistive tracks 74 may share the same conductor. A polymer alignment layer 78 overlies the tracks 74 and conductors 76 and serves to align the adjacent liquid crystal layer 80. Adjacent the upper surface of the liquid crystal layer 80 there is provided an orthogonal series of resistive tracks 82 and associated conductors 84 deposited on a cover layer (not shown). Only one upper resistive track 82 is shown, but it will be appreciated that in practice there will be many individually addressable parallel tracks 76 and 84 in both directions, defining rows and columns of pixels, e.g. at 86.

In use, the voltage profiles across the tracks 82 and 74 above and below a pixel 86 are selected to give a notional voltage surface across the pixel which generates the required electro-optic output. Thus, a typical voltage profile applied to the upper track 82 is an inclined ramp or plane bridging the voltage levels applied to the conductors 76.

Likewise, a typical profile applied to the lower track, is an inclined plane between the voltage levels applied to the conductors 76.

The ramps, and their combined effects are therefore similar to those described in connection with FIGS. 2(a) to 2(d). The various drive schemes mentioned above may be used to drive this embodiment.

The above embodiments may be used with a wide range of combinations of electro-optic materials and addressing techniques. Thus the invention may also be embodied in Passive Matrix Twisted Nematic (TN) LCDS, Passive Matrix Supertwist Nematic (STN) LCDs, Active Matrix TN LCDs, Stabilised Cholesteric Liquid Crystal Devices, Passive Matrix Ferroelectric and Field Emissive Devices.

What is claimed is:

1. A display comprising,
   first and second substrate means provided to either side of a layer of electro-optic material,
   the first substrate means having thereon at least one electrically resistive surface,
   electrode means for applying selected voltages to respective points across said resistive surface, said electrode means comprising an array of point electrodes,
   drive means for applying selected voltages to said electrode means to provide across a pixel an electrical field whose magnitude varies in at least one direction transverse to the thickness of the layer of electro-optic material, thereby to provide a non-uniform optical output across said pixel, wherein said voltage at each point electrode is independently controllable.

2. A display according to claim 1, wherein said first substrate means has thereon an array of discrete electrically resistive surface elements each defining a pixel, each surface element associated therewith electrode means comprising a group of at least three electrodes.

3. A display according to claim 2, wherein each of said resistive surface elements is generally rectangular, with the electrodes of the group located in the corner regions thereof.

4. A display comprising,
   first and second substrate means provided to either side of a layer of electro-optic material,
   the first substrate means having thereon at least one electrically resistive surface,
   electrode means for applying selected voltages to respective points or regions across said resistive surface,
   drive means for applying selected voltages to said electrode means to provide across a pixel an electrical field whose magnitude varies in at least one direction transverse to the thickness of the layer of electro-optic material, thereby to provide a non-uniform optical output across said pixel,
   wherein said electrically resistive surface is a continuous electrically resistive surface, and said electrode means comprises a plurality of electrodes for applying selected voltages to respective points or regions on said resistive surface, and
   wherein said plurality of electrodes comprises an array of point electrodes for applying selected voltages to the respective points at spaced locations across the electrically resistive surface, wherein said voltage at each point electrode is independently controllable.

5. A display comprising,
   first and second substrates provided to either side of a layer of electro-optic material,
   the first substrate having thereon at least one electrically resistive surface,
   a plurality of electrodes for applying selected voltages to respective points or regions across said resistive surface,
   a voltage source for applying selected voltages to selected electrodes of said plurality of electrodes to provide across a pixel an electrical field whose magnitude varies in at least one direction transverse to the thickness of the layer of electro-optic material, thereby to provide a non-uniform optical output across said pixel, and
   wherein said electrically resistive surface is a continuous electrically resistive surface, and said plurality of electrodes comprises an array of point electrodes for applying selected voltages to the respective points at spaced locations across the electric resistive surface, wherein said voltage at each point electrode is independently controllable.

6. A method of operating a display comprising first and second substrates provided to either side of a layer of electro-optic material, the first substrate having thereon at least one electrically resistive surface, and the display further comprising a plurality of electrodes for applying selected voltages to respective points or regions across said resistive surface, wherein an array of pixels is defined for the display, the method comprising:
   applying selected voltages to selected electrodes of said plurality of electrodes to provide across one or more pixels an electrical field whose magnitude varies in at least one direction transverse to the thickness of the layer of electro-optic material, thereby providing a non-uniform optical output across said pixel,
   wherein said electrically resistive surface is substantially continuous and said plurality of electrodes comprises an array of point electrodes for applying selected voltages to the respective points at spaced locations across the electrically resistive surface, wherein said voltage at each point electrode is independently controllable, wherein
   applying selected voltages to selected electrodes comprises providing peak voltages selected for each selected electrode; and
   providing an area of optical output around each selected electrode determined by the selected voltage applied thereto.

7. A display comprising:
   first and second substrates provided to either side of a layer of electro-optic material, the first substrate having thereon at least one resistive surface;
   an array of point electrodes for selectively applying voltages to points on the resistive surface; and
   voltage drivers for applying selected voltages to the point electrodes of the array to provide voltages varying between point electrodes on the resistive surface and hence electrical fields between corresponding points on the first and second substrates and the optical output of the electro-optic material vary in accordance with the voltages varying between point electrodes, wherein said voltage at each point electrode is independently controllable.

8. A display as claimed in claim 7, wherein the resistive surface comprises an array of resistive cells.

9. A display as claimed in claim 8, wherein each of said resistive cells has four sides, and wherein at least three corners of each resistive cell contains a point electrode from the array of point electrodes.

10. A display as claimed in claim 7, wherein the resistive surface is continuously resistive between successive point electrodes.

11. A method of driving a display having first and second substrates provided to either side of a layer of electro-optic material, the first substrate having thereon at least one resistive surface, an array of point electrodes for selectively applying voltages to points on the resistive surface; and voltage drivers for applying selected voltages to the point electrodes of the array, the method comprising:

selectively applying different voltages to at least two different point electrodes of the array to establish voltage gradients between said two different point electrodes across the resistive surface, wherein said voltage at each point electrode is independently controllable;

thereby driving the display such that a threshold voltage for the layer of electro-optic material is exceeded at a point between the two different point electrodes.

* * * * *